Sept. 30, 1969    D. R. AYER ET AL    3,470,469
SLOTTED STRIP TRANSMISSION LINE USING PROBE TO MEASURE
CHARACTERISTICS OF THE LINE
Filed Aug. 7, 1963    4 Sheets-Sheet 1

INVENTORS
DONALD R. AYER
BY WILLIAM R. LOWE

ATTORNEY

INVENTORS
DONALD R. AYER
WILLIAM R. LOWE
BY
ATTORNEY

# United States Patent Office 3,470,469
Patented Sept. 30, 1969

3,470,469
SLOTTED STRIP TRANSMISSION LINE USING PROBE TO MEASURE CHARACTERISTICS OF THE LINE
Donald R. Ayer and William R. Lowe, Nashua, N.H., assignors to Sanders Associates, Inc., Nashua, N.H., a corporation of Delaware
Filed Aug. 7, 1963, Ser. No. 300,535
Int. Cl. G01r 23/04, 27/02
U.S. Cl. 324—95                                    10 Claims

ABSTRACT OF THE DISCLOSURE

The present invention pertains to an improved slotted strip transmission line having a probe extending through the slot and disposed in the space between the conducting strips of a split center conductor which are at substantially the same potential, whereby the space wherein said probe is disposed has substantially no variation in potential, thereby enabling said probe to measure the field distribution along the line, and thus to determine the characteristics of the line such as impedance, wavelength and relative phase of the field.

---

Figure 1:
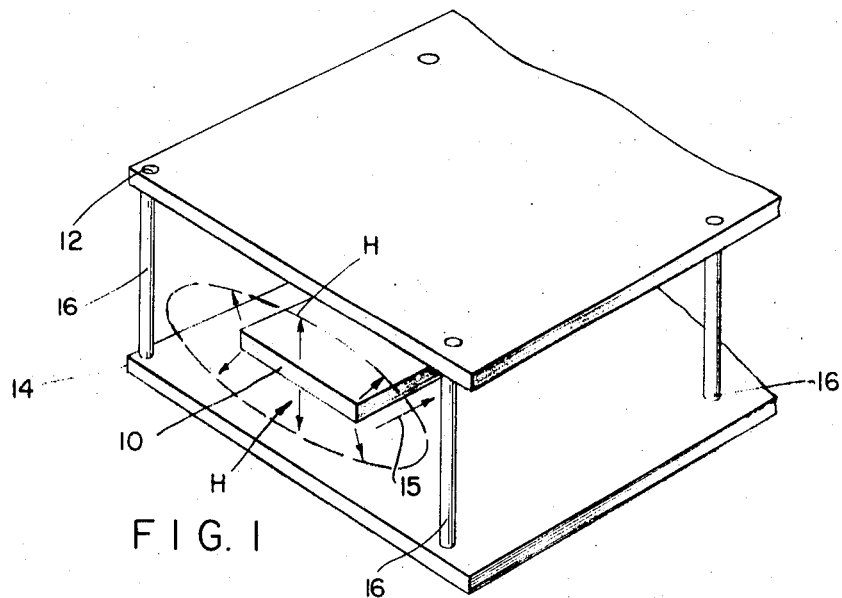

This invention relates to the art of high frequency measurements. More particularly, it relates to an improved slotted transmission line section wherein a probe extending through the slot may be moved along the line to ascertain the variation of field strength therealong. The slotted section is formed as a strip transmission line unit with the probe entering from the side midway between the ground plane conductors of the line and terminating at or in the space between the conducting strips of a split center conductor.

A slotted line unit generally consists of a transmission line having a longitudinal slot in the outer conductor, with a probe extending through the slot into the interconductor space. A small amount of energy is extracted from the field in the transmission line by means of the probe, and measurement of this energy provides an indication of the magnitude of the electromagnetic field in the immediate vicinity of the probe. The probe may be moved along the slot to measure the field distribution along the line, and, by means of such measurements, the unit may be used to determine such quantities as impedance, wavelength and relative phase.

Prior to our invention, slotted lines have generally taken the form of a waveguide or coaxial line with a fixture mounted on the outer conductor to carry the probe extending through the slot therein. The fixture rides along the outer conductor for changes in probe position. Another type of transmission line used for slotted sections is strip line, in which the inner conductor is disposed midway between a pair of outer or ground plane conductors. In this case also, a fixture has been used to position the probe adjacent to a slot in one of the outer conductors and move the probe along the slot to ascertain field conditions at various points along the transmission line.

In either case, the amount of energy coupled to the probe is highly dependent on the distance the probe projects toward the transmission line. Therefore, great care must be taken in machining the surfaces along which the probe mounting fixture moves in order to minimize measuring errors due to changes in coupling. Furthermore, the slot itself introduces a change in characteristic impedance in the line which must be compensated for if the measurements taken are to be a true indication of condition in a line to which the slotted section is connected.

Accordingly, it is a principal object of our invention to provide an improved slotted strip line capable of accurate measurement of field strength at various points in the interior of the line.

Another object of our invention is to provide a slotted line in which the field distribution is substantially undisturbed by a longitudinal probe slot.

A further object of our invention is to provide a slotted line of the above character in which the probe can be relatively closely coupled to the transmission line.

Yet another object of our invention is to provide a slotted line in which the coupling varies only minimally as the probe is moved along the line and yet which is relatively inexpensive to construct.

Other objects of the invention will in part by obvious and will in part appear hereinafter.

The invention accordingly comprises the features of construction, combination of elements and arrangement in parts which will be exemplified in the construction hereinafter set forth and the scope of the invention will be indicated in the claims.

In general, a slotted line embodying the features of our invention is formed as a strip line unit in which the inner conductor comprises a pair of spaced-apart conducting strips disposed in registration with each other. Instead of projecting through one of the outer or ground plane conductors, or into a region adjacent to a slot in one of these conductors, the probe extends parallel to the conductors, preferably with one end disposed in the space between the conducting strips of the inner conductor. The conducting strips are at the same potential, and, therefore, there is only a very small variation in potential in this space. Thus, movement of the probe, which alters slightly the position of the end thereof disposed between the conducting strips, produces an insignificant variation in coupling from the transmission line to the probe. Accordingly, the tolerance requirements for the surface over which the probe carriage rides are materially less stringent than in prior slotted lines.

In a modified embodiment of the invention, the probe is mounted in a rotary fixture which positions the end of the probe adjacent to the edge of the inner conductor of the strip transmission line. While the preferred embodiment provides somewhat greater immunity from the effects of movements of the probe transverse to the transmission line, the modified system does have a relatively low cost construction, with an improvement in performance as compared to similar prior devices.

Figure 2:
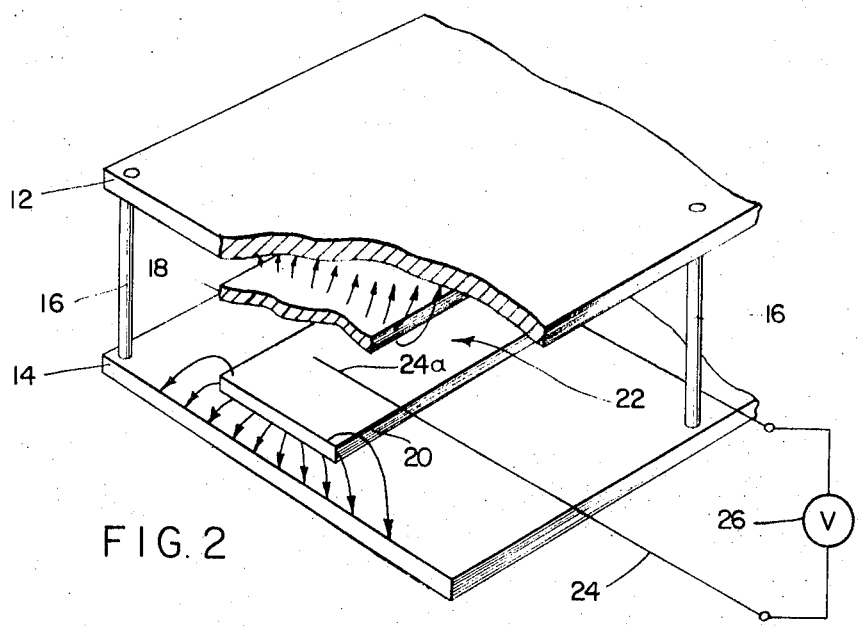
Figure 3:
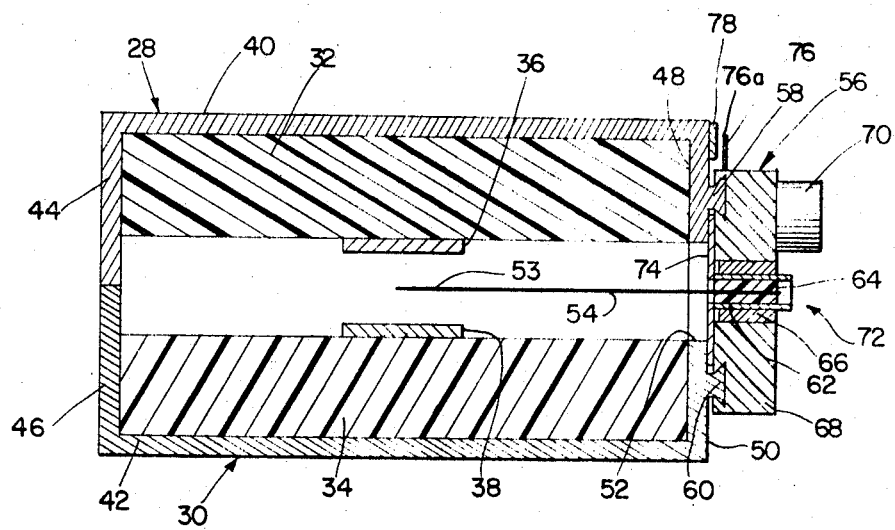
Figure 4:
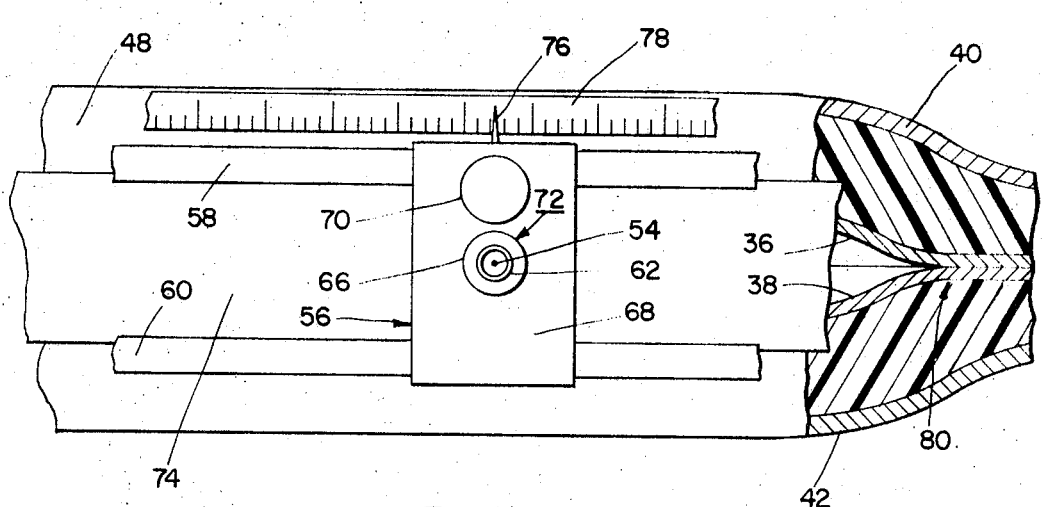
Figure 5:
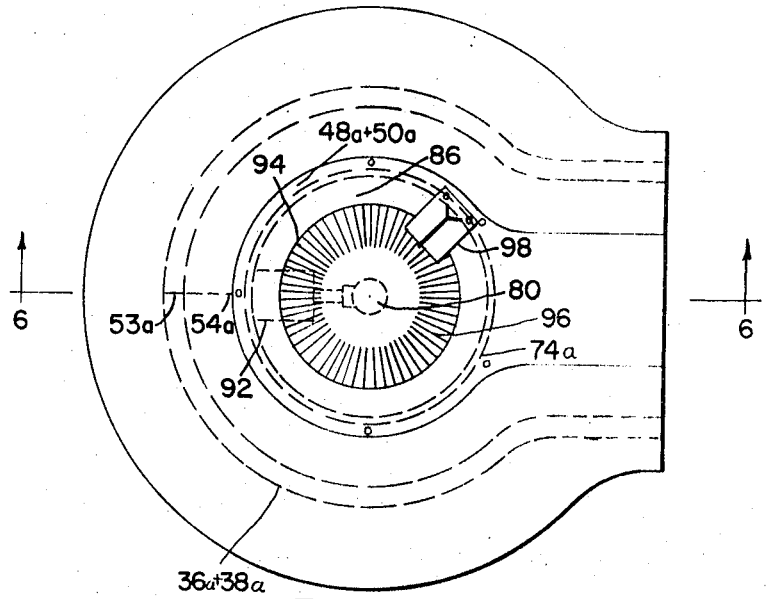
Figure 6:
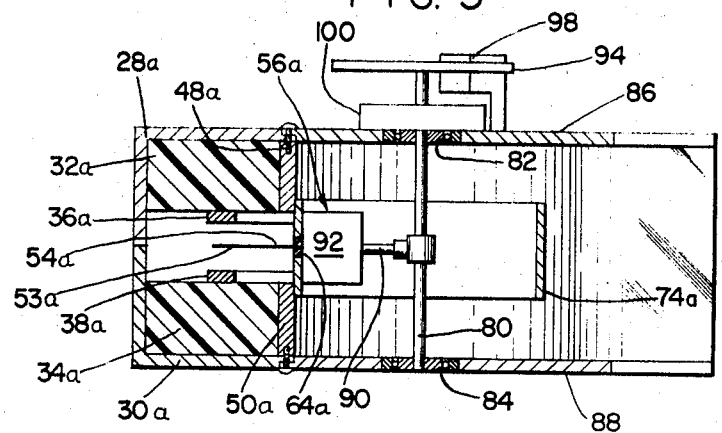
Figure 7:
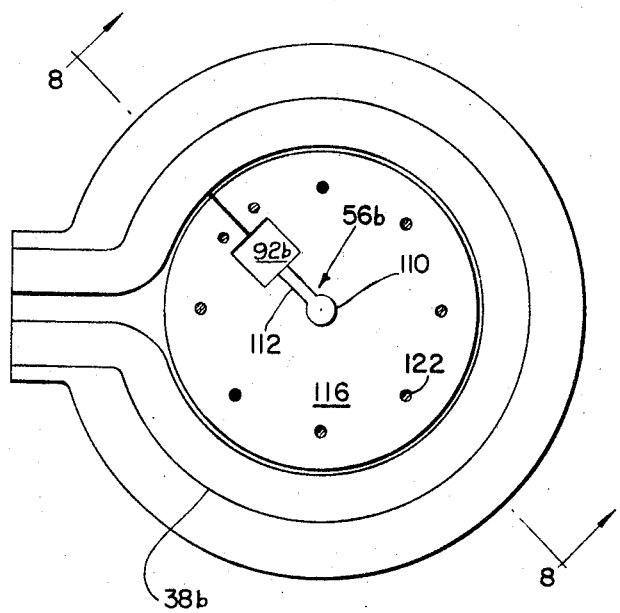
Figure 8:
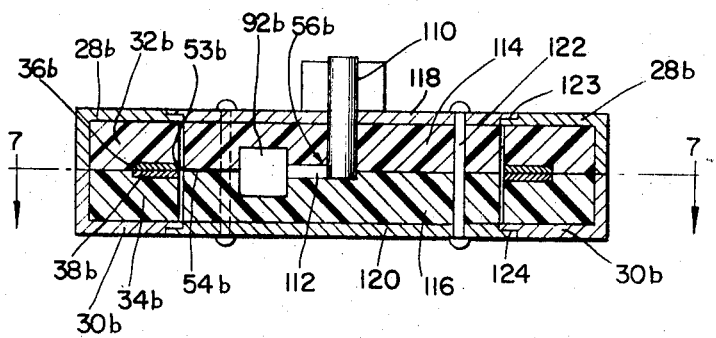

For a fuller understanding of the nature and objects of the invention, reference should be had to the following detailed description taken in connection with the accompanying drawings, in which:

FIG. 1 is a simplified perspective view of a section of strip transmission line, FIG. 2 is a schematic representation of a slotted line incorporating the principles of our invention, FIG. 3 is a transverse section of a straight slotted line, FIG. 4 is a side elevation, partly broken away, of the slotted line of FIG. 3, FIG. 5 is a top plan view of a circular slotted line made according to our invention, FIG. 6 is a section taken along line 6—6 of FIG. 5, FIG. 7 is a top plan view of a modified circular slotted line, and FIG. 8 is a section taken along line 8—8 of FIG. 7.

In FIG. 1 we have illustrated the field distribution in a typical strip transmission line. The line has an inner conductor 10 situated between and parallel to a pair of outer or ground plane conductor 12 and 14. The conductors 10, 12 and 14 are flat and may be quite thin. For example, they may be formed of foil bonded to dielectric material (not shown) filling the space between them. At an instant of time when the conductor 10 is positive with respect to the ground planes 12 and 14 and the current in the conductor 10 is in the direction of the arrow 15, the field distribution in the transmission line is shown in FIG. 1, with the solid arrows representing the electric field E and the dash lines representing the magnetic field H.

The field configuration of FIG. 1 is indicative of the TEM propagation mode, more fully discussed in U.S. Patent No. 2,812,501, which issued November 5, 1957, to D. J. Sommers for "Transmission Line." However, it is possible to transmit other modes on the line under certain conditions. For example, if the inner conductor 10 is offset from its nominal position midway between the ground planes 12 and 14, the ground planes will be at somewhat different potentials. This difference in voltage will generate a parallel plate mode. Accordingly, the ground planes are "shorted" together by a plurality of pins 16 spaced along both edges of the outer conductor. The pins impose an equipotential condition on the planes and thereby suppress this mode. For effective suppression, the spacing of the pins in the lengthwise direction of the line should be less than a half wavelength. Ordinarily, this spacing is on the order of one-eight wavelength or less.

Another limitation of pin spacing results from the desirability of avoiding a resonant condition in any loop defined by the ground planes and a pair of adjacent pins. A resonant loop will distort the transmission characteristics of the line as well as facilitate radiation of energy therefrom. Resonance occurs when the length of the loop is an integral number of wavelengths, and, accordingly, the distance between adjacent pins should be considerably less than the spacing providing a wavelength loop.

If either of the transverse dimensions, i.e., ground plane to ground plane or pin to pin spacing is greater than a half wavelength, a transverse electrical waveguide mode may be excited. Therefore, both these dimensions should be less than a half wavelength. There is also a restriction on the length of the circumferential path around the inner conductor 10 and passing midway between the inner conductor and the ground planes 12 and 14 and pins 16. This path should be less than a wavelength. Otherwise, the line will support a higher order transverse electric transmission line mode.

In FIG. 2 there is shown a variation of strip line used in our modular units. The line has a center conductor which comprises a pair of conducting strips 18 and 20 in register with each other. Transmission lines of this type are more fully disclosed in U.S. Patent No. 2,810,892, which issued October 22, 1957, to Daniel Blitz for "Transmission Line" in which the conducting strips are shown as being generally in contact with each other. In accordance with the present invention, however, the strips 18 and 20 are separated as shown in FIG. 2. Since they are connected together at some other point in the system, they have the same potential, and, thus, the electric field configuration in the transmission line takes the general form indicated by the electric flux lines 22. It is quite clear that in the space between the strips 18 and 20 the potential is everywhere almost exactly equal to that of the strips. From another viewpoint, the potential varies but little from point to point within this space.

It should be noted that the relative absence of an electric field in the space between the strips 18 and 20 does not prevent the extraction of power from the transmission line by means of a probe extending between the strips. There is a difference between the potential in the space and that of the outer conductors 12 and 14, and, thus, current must flow in a conductor connected between the space and the outer conductors, even though there is no physical contact with the inner conducting strips. In fact, this principle is incorporated in a coupling device disclosed in U.S. Patent No. 2,860,308 for "High Frequency Transmission Line Coupling Device," which issued November 11, 1958, to C. W. Bales.

Still referring to FIG. 2, a metallic probe 24 extends from the space between the inner conductor strips 18 and 20 to a point effectively beyond the electromagnetic field of the transmission line. Indicating means, illustratively shown as a voltmeter 26, registers the difference in voltage between the probe 24 and the ground plane conductors 12 and 14. This voltage difference is proportional to the strength of the electric field at the longitudinal position of the probe in the transmission line (i.e., any point in the plane of FIG. 2). The voltmeter 26 is directly responsive to the difference in potential between the ground plane conductors and the space between the conducting strips 18 and 20, in which the end 24a of the probe 24 is disposed.

Since the potential in the space between the strips 18 and 20 is substantially invariant in the plane of the drawing, the end 24a of the probe may be moved about within this space without affecting the reading of the meter 26. That is, the probe 24 may be moved to the right or left (FIG. 2) and up or down without significantly changing the measurements to be taken. Furthermore, small changes in the angular orientation of the probe (in the plane of the drawing) do not have any substantial effect on the measurement. Therefore, the mechanism used to transport the probe 24 along the slotted line may operate with much less rigorous requirements as to transverse movement of the probe than prior slotted line mechanisms. Furthermore, with the end 24a of the probe in a region having the same potential as the conducting strips 18 and 20, tight coupling between the transmission line and the probe is obtained, thus facilitating measurement of relatively weak signals. Another advantage of our slotted line lies in the fact that the slot does not extend through the ground plane conductors where the electric field is strongest, but rather from the side of the line, where the field is negligible. Therefore, the slot does not affect the characteristic impedance.

As seen in FIG. 3, a slotted line may be specifically embodied in a unit comprising a pair of housing members generally indicated at 28 and 30 enclosing insulators 32 and 34 to which are bonded inner conducting strips 36 and 38. The housing members have parallel walls 40 and 42 which serve as ground plane conductors for the conducting strips 36 and 38. Side walls 44, 46, 48 and 50 complete the enclosure. A slot 52, between the walls 48 and 50, permits entry of the end 53 of a probe 54 into the relatively field-free region between the conducting strips 36 and 38. The probe 54 is mounted in a carriage generally indicated at 56, which rides on guides 58 and 60 to transport the probe along the transmission line.

As shown in FIGS. 3 and 4, the carriage 56 includes a tube 62 in which the probe 54 is centrally positioned by means of a dielectric insert 64. The tube 62 is preferably removably fitted within a sleeve 66, and the sleeve is fitted with a slide 68 interfitting with the guides 58 and 60. A knob 70, attached to the carriage 56, facilitates movement of the carriage 56 along the guides.

The outer ends of the tube 62 and probe 54 may be shaped to form a connector indicated at 72 for connection of the unit to a suitable voltage or power indication device. Ordinarily, the indicating device will include a dector disposed adjacent to the connector. Alternatively, the detector may be incorporated within the connector.

Still referring to FIGS. 3 and 4, the unit may include a shorting strip 74, attached to the slide 68, which overlaps the slot 52 to slidably engage the walls 48 and 50. The probe 54 projects through the shorting strip 74 and is isolated therefrom by the dielectric insert 64. Thus, the abutting walls 44 and 46 (FIG. 3) on one side and the wall 48, strip 74 and wall 50 on the other side serve to interconnect the ground plane walls 40 and 42 in the same manner as the shorting pins 16 of FIG. 1. Therefore, the slot 52 has virtually no effect on the characteristics of the transmission line, and, furthermore, changes in the position of the carriage 56 along the line do not alter the line characteristics, insofar as the effect of the slot 52 is concerned.

The carriage 56 may also be provided with a pointer 76 attached to the carriage 56 and having a tip 76a disposed opposite the indicia on a scale 78. The scale 78 may be calibrated in terms of electric distance along the slotted line, or, if a single frequency is to be used, it may be calibrated directly in terms of wavelength.

Referring to FIG. 4, in a region generally indicated at 80, the transmission line undergoes a transition from the spaced-apart configuration of the inner conductor strips 36 and 38 in the slotted section to a conventional configuration to the right thereof, where the strips are in contact with each other. The characteristic impedance of a strip transmision line of the type illustrated depends on the ratio of the thickness of the composite center conductor to the distance between the ground plane conductors, and, therefore, the ground plane conductor spacing is less to the right of the region 80 than to the left thereof in order to maintain a uniform characteristic impedance. The characteristic impedance also depends on the width of the center conductor, and, therefore, the widths of the strips 36 and 38 may be also varied to provide the same impedance on both sides of the region 80.

The coupling to the probe may be varied by changing the diameter of the probe 54. The diameter of the probe determines its inductance, and at high frequencies the inductive reactance of a short length of fine wire may be considerable. Thus, less power can be drawn from a small diameter probe than a relatively large diameter one. In other words, the coupling is less in the case of a smaller diameter probe 54. Probes may be interchanged by removing the tube 62 and replacing it with one carrying a different size probe.

In FIGS. 5 and 6 we have illustrated a circular slotted section whose operation is essentially the same as that of the straight section shown in FIGS. 3 and 4. Accordingly, those parts in FIGS. 5 and 6, which correspond to parts in FIGS. 3 and 4, have been given the same reference numerals, with the suffix "a" added. Thus, a probe 54a having a tip 53a disposed between conducting strips 36a and 38a is supported by a carriage generally indicated at 56a. The carriage 56a, which moves the probe 54a in a circular path to follow the configuration of the strips 36a and 38a, includes a shaft 80 journalled for rotation in bearings 82 and 84. The bearings are supported on the housing members 28a and 30a by plates 86 and 88, respectively.

An arm 90, extending radially from the shaft 80, supports a rectifier unit 92, and the latter, in turn, carries a removable probe 54a, which may be interchanged with other probes having different diameters. The rectifier unit 92 also supports the shorting strip 74a, which is annular in shape to conform to the walls 48a and 50a, which it interconnects. The probe 54a projects through the shorting strip 74a and is isolated therefrom by a dielectric insert 64a. In addition to suitable rectifying elements, the rectifier unit may include a voltmeter (not shown), or, as an alternative, field strength may be indicated by an external voltmeter connected to the unit 92.

The position of the probe 54a in FIGS. 5 and 6 may be determined by a dial 94 provided with suitable indicia 96 (FIG. 5) disposed between a pointer 98. Preferably, the dial is coupled to the shaft 80 by an adjustable reduction gear unit 100. The gear reduction may be varied according to frequency, permitting the dial 94 to be scaled directly in terms of wavelength, and thus simplifying the calculations associated with the use of a slotted line.

An advantage of the circular configuration lies in the fact that the shorting strip 74a does not extend beyond the rest of the unit at any position of the probe. This results in a saving of space as compared with the straight unit.

In FIGS. 7 and 8, we have illustrated a modified circular slotted section whose operation is basically similar to that of the slotted sections of FIGS. 3–6. Accordingly, corresponding parts have been given the same reference numeral, with the suffix "b" added. The primary difference is that the conducting strips 36b and 38b are not separated to permit entry of the probe tip therebetween. Rather, these conductors are in contact with each other throughout their lengths, while the tip 53b of the probe 54b is disposed in close proximity to the interface of the strips, where the electric field is close to zero. In this manner, coupling between the probe and the transmission line is achieved without significant disruption of the field.

As seen in FIGS. 7 and 8, the probe 54b is supported by a carriage generally indicated at 56b. The strips 36b and 38b are spaced from housing members 28b and 30b by insulators 32b and 34b. These insulators are terminated parallel to the edge of the strips 36b and 38b on the side along which the section is probed. Carriage 56b rotates to move the probe in a circular path conforming to the configuration of the strips.

More specifically, a rectifier unit 92b, connected to the probe 54b, is attached to a shaft 110 by a radially extending arm 112. The rectifier unit, the arm and the probe are disposed in accurately formed indentations in the opposing surfaces of circular insulators 114 and 116. The circular insulators, dimensioned to fit snugly within the circle defined by the strips 36b and 38b, are retained in juxtaposition by plates 118 and 120.

The insulators 114 and 116, being in close proximity to the insulators 32b and 34b, provide the dielectric medium for the fringe portions of the field in the slotted section. This physical relationship is slightly exaggerated in the drawings for the purpose of clarity.

Circumferentially spaced pins 122, which extend vertically through insulators 114 and 116 and plates 118 and 120, accomplish the function of the shorting strips in FIGS. 3–6 in addition to retaining the insulators and plates in position. The pin spacing should be less than a half wavelength at the operating frequency to suppress undesirable modes of propagation.

The circular insulators and the plates 118 and 120 are adapted to rotate as a unit upon rotation of the shaft 110, which extends upwardly through the center of insulator 114, to move the probe in a circular path conforming to the configuration of the strips 36b and 38b. The plates make sliding electrical contact with the housing members 28b and 30b along annular bearing surfaces 123 and 124. Since the probe and rectifier unit 92b are solidly encased in the insulators, vertical movement (FIG. 8) of the probe tip 53b is virtually impossible, and thus the coupling between the probe and the field remains substantially constant as the former is moved along the slotted line.

The upper end of the shaft 110 may accommodate a probe position indicator as in FIGS. 5 and 6.

Although the slotted section of FIGS. 7 and 8 is not as suitable for accurate measurement of the field as the slotted sections of FIGS. 3–6, it has definite advantages in applications where the requirements are not as rigorous. One such advantage is the fact that, since the conducting strips 36b and 38b are not separated, it is unnecessary to match the impedance of the slotted section to that of the adjoining sections of the transmission line where the strips are in contact.

It will thus be seen that the objects set forth above, among those made apparent from the preceding description, are efficiently attained and, since certain changes may be made in the above construction without departing from the scope of the invention, it is intended that all matter contained in the above description or shown in the accompanying drawings shall be interrupted as illustrative and not in a limiting sense.

What is claimed is:
1. A slotted line comprising, in combination, first and second parallel ground plane conductors, first and second spaced-apart inner conducting strips in register with each other and disposed substantially midway between said ground plane conductors and parallel thereto, means maintaining said strips at the same potential whereby the space between them is relatively field-free, conducting wall means extending along one side of said line and connecting together said ground plane conductors, first and second conducting means extending along the other side of said line, said first conducting means extending from said first ground plane conductor toward said second ground plane conductor and said second conducting means extending from said second ground plane conductor toward said first ground plane conductor, said conducting means being spaced apart to define a longitudinal slot in said line, a shorting strip covering said slot and slidably engaging said first and second conducting means, a probe extending into said line through said slot and said shorting strip and having an end disposed in said space and spaced from conducting strips, means supporting said shorting strip and said probe for movement along said line, and indicating means responsive to the difference in potential between said ground plane conductors and the portion of said probe disposed in said space.

2. The combination defined in claim 1 further comprising a transmission line section having an inner conductor disposed between a pair of outer conductors, and a transmission line transition unit connecting said inner conductor with each of said spaced-apart inner conductor strips and connecting said outer conductors with said ground plane conductors, said unit providing a matched transition between said section of line and the line having said spaced-apart strips.

3. A slotted line comprising, in combination, first and second channel members each having a U-shaped cross section, said members opening toward each other, one side of each of said channels being deeper than the other side thereof, said deeper sides abutting each other, said other sides being spaced apart to form a longitudinal slot, first and second inner conducting strips disposed within said members in register with each other and substantially parallel with the bottoms of said channel members, thereby to form a strip transmission line in which said bottoms are ground plane conductors, said strips also being parallel to said slot, said sides of said members being spaced substantially farther from said inner conducting strips than said bottoms, whereby the electric field is substantially less at said sides than said bottoms, a probe extending through said slot and having an end spaced from said conducting strips and disposed in the space between them, a carriage mounted on said members and movable along said slot, said carriage supporting said probe for movement therewith, and a shorting strip covering said slot and in slidable engagement with said other sides, said shorting strip being connected to said carriage for movement with said probe.

4. The combination defined in claim 3 in which said inner conducting strips are arcuate, said carriage including a shaft pivoted at the center of the curvature of said strips, and means mounting said probe on said shaft, whereby said probe rotates with said shaft to maintain said end of said probe within said space between said inner conducting strips.

5. The combination defined in claim 3 including indicating means responsive to the difference in potential between said channel members and the portion of said probe outside said channel members.

6. A slotted line comprising, in combination, first and second substantially parallel ground plane conductors, first and second spaced-apart inner conducting strips in register with each other and disposed substantially midway between said ground plane conductors and parallel thereto, said first and second ground plane conductors and said first and second inner conducting strips being arranged to describe an arcuate path, means maintaining said strips at the same potential whereby the space between them is relatively field-free, first conducting wall means extending along one side of said line and connecting together said ground plane conductors, second conducting wall means extending along the other side of said line and connecting together said ground plane conductors, said second conducting wall means having a slot formed therein parallel to said line, a shorting strip covering said slot and slidably engaging said second conducting wall means, a laterally extending probe spaced from said strip and having one end disposed through said shorting strip and into said space, means supporting said probe and said shorting strip for circular movement about the center of curvature of said strips thereby maintaining said end within said space, and indicating means responsive to the difference in potential between said ground plane conductors and the portion of said probe disposed in said space.

7. The slotted line claimed in claim 6 wherein said strips are spaced from said first and second ground plane conductor by an insulator, said insulator being terminated parallel to the edges of said strips on the side adjacent said probe.

8. The slotted line claimed in claim 7 wherein said probe is substantially encapsulated in a dielectric material, said material being moveable with said means supporting said probe.

9. A circular slotted line comprising, in combination, a conductive outer conductor structure having first and second opposed surfaces uniformly spaced apart and a curved wall connected between said surfaces, first conductive means extending between and connected with said first and second surfaces spaced from said wall, said wall and said conductive means maintaining said first and second surfaces at the same potential, second conductive means extending along the side of said line opposite said curved wall and connecting together said first and second opposed surfaces, said second conductive means having a slot formed therein parallel to said line, a pair of curved strip transmission line inner conductor strips spaced apart and in register with each other, dielectric support means supporting said inner conductor strips within said outer conductor structure between said wall and said conductive means and with said strips being parallel to said first and second surfaces and symmetrically spaced therefrom by substantially less than the spacings of said strips from said wall and from said conductive means, a shorting strip covering said slot and slidably engaging said second conducting means, a probe extending through said shorting strip and said second conductive means and having an inner end disposed in the space between said inner conductor strips to assume an electrical potential proportional to the potential of said strips, positioning means supporting said probe and said shorting strip for movement along said curved inner conductor strips with its inner end remaining between them, and indicating means responsive to the difference in potential between said first and second surfaces and said inner end of said probe disposed in said space.

10. The slotted line defined in claim 9 further comprising a transmission line section having an inner conductor disposed between a pair of ground plane conductors, and a transmission line transition unit connecting said inner conductor with each of said spaced-apart strips and connecting said ground plane conductors with said outer conductor surfaces, said unit providing a matched transmission line transition between the line having said spaced-apart inner conductor strips and said section of line.

References Cited

UNITED STATES PATENTS

| | | | |
|---|---|---|---|
| 2,609,422 | 9/1952 | Hulstede | 324—95 XR |
| 2,810,892 | 10/1957 | Blitz | 333—96 XR |
| 2,812,501 | 11/1957 | Sommers | 333—97 XR |
| 2,860,308 | 11/1958 | Bales | 333—84 XR |
| 2,996,692 | 8/1961 | Christensen | 324—95 XR |
| 3,015,081 | 12/1961 | Ayer | 333—84 XR |

OTHER REFERENCES

Altschuler et al.: I.R.E. Transactions on Microwave Theory and Techniques; May 1960; pp. 328 and 329.

Cohn: I.R.E. Transactions on Microwave Theory and Techniques; March 1955; pp. 119, 123, 124, 126.

RUDOLPH V. ROLINEC, Primary Examiner

ERNEST F. KARLSEN, Assistant Examiner

U.S. Cl. X.R.
324—72